United States Patent
Testardi

(10) Patent No.: US 7,624,109 B2
(45) Date of Patent: Nov. 24, 2009

(54) DISTRIBUTED ASYNCHRONOUS ORDERED REPLICATION

(75) Inventor: Richard Testardi, Boulder, CO (US)

(73) Assignee: Texas Memory Systems, Inc., Houston, TX (US)

( * ) Notice: Subject to any disclaimer, the term of this patent is extended or adjusted under 35 U.S.C. 154(b) by 379 days.

(21) Appl. No.: 11/067,453

(22) Filed: Feb. 25, 2005

(65) Prior Publication Data

US 2005/0204106 A1    Sep. 15, 2005

Related U.S. Application Data

(60) Provisional application No. 60/548,545, filed on Feb. 27, 2004.

(51) Int. Cl.
*G06F 7/00* (2006.01)
*G06F 17/30* (2006.01)

(52) U.S. Cl. .................. 707/8; 707/1; 707/2; 707/202; 707/204

(58) Field of Classification Search .................. None
See application file for complete search history.

(56) References Cited

U.S. PATENT DOCUMENTS

| | | | | |
|---|---|---|---|---|
| 6,434,681 | B1 * | 8/2002 | Armangau | 711/162 |
| 6,732,124 | B1 * | 5/2004 | Koseki et al. | 707/202 |
| 6,947,956 | B2 * | 9/2005 | Olstad et al. | 707/200 |
| 6,947,981 | B2 * | 9/2005 | Lubbers et al. | 709/223 |
| 6,959,373 | B2 | 10/2005 | Testardi | |
| 7,010,721 | B2 * | 3/2006 | Vincent | 714/20 |
| 7,076,508 | B2 * | 7/2006 | Bourbonnais et al. | 707/202 |
| 7,149,769 | B2 * | 12/2006 | Lubbers et al. | 709/201 |
| 7,177,886 | B2 * | 2/2007 | Pruet, III | 707/204 |
| 2002/0147774 | A1 * | 10/2002 | Lisiecki et al. | 709/203 |
| 2003/0140209 | A1 * | 7/2003 | Testardi | 711/203 |
| 2003/0140210 | A1 | 7/2003 | Testardi | |
| 2003/0187947 | A1 * | 10/2003 | Lubbers et al. | 709/217 |
| 2003/0212789 | A1 * | 11/2003 | Hamel et al. | 709/225 |
| 2003/0217119 | A1 * | 11/2003 | Raman et al. | 709/219 |
| 2005/0207052 | A1 | 9/2005 | Testardi | |

OTHER PUBLICATIONS

"Flexible update propagation for weakly consistent replication", by Petersen et al., ACM SIGOPS Operating System Review, vol. 31, Issue 5 (Dec. 1997), pp. 288-301.*

IBM, Redbooks Technote "External Time Reference (ETR) Requirements for z990"—Abstract, pp. 1-3, available at http://www.redboks.ibm.com/abstracts/tins0217.html?Open, originally published Jun. 19, 2003, last visited Jan. 11, 2006.

Alain Azagury et al., "Highly Available Cluster: A Case Study," IEEE, pp. 404-413 (1994).

International Search Report for PCT/US2005/005911.

* cited by examiner

*Primary Examiner*—Tim T. Vo
*Assistant Examiner*—Jay A Morrison
(74) *Attorney, Agent, or Firm*—Locke Lord Bissell & Liddell LLP

(57) ABSTRACT

Described are methods, systems, and apparatus, including computer program products, for achieving distributed asynchronous ordered replication. Distributed asynchronous ordered replication includes creating a first journal for a first set of I/O data, creating a second journal for a second set of I/O data, and temporarily preventing committal, of the second set of I/O data until the second journal is created. In some examples, the first and second journals comprise entries. The entries of the first and second journals include counter values. The entries of the first journal typically have a different counter value than the entries of the second journal.

26 Claims, 7 Drawing Sheets

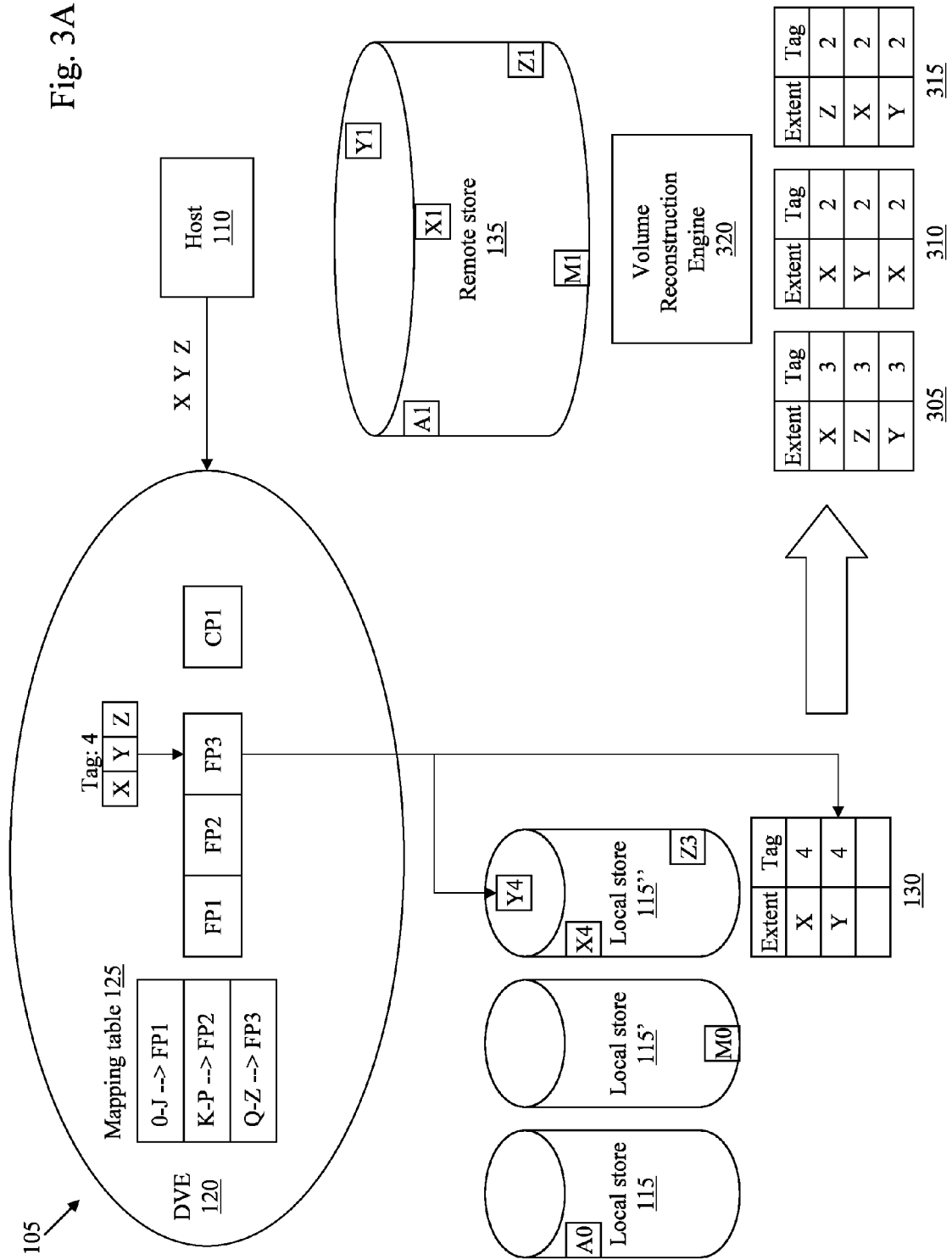

DISTRIBUTED ASYNCHRONOUS ORDERED REPLICATION

CROSS-REFERENCE TO RELATED APPLICATION

This application claims priority to and the benefit of, and incorporates herein by reference, in its entirety, provisional U.S. patent application Ser. No. 60/548,545, filed Feb. 27, 2004.

TECHNICAL FIELD

The invention relates to distributed asynchronous ordered replication.

BACKGROUND INFORMATION

Storing data in a computing environment generally involves two main components: (1) a host that receives data from user applications and (2) some means for storing that data, such as a disk, a database, a file system, and/or some combination of such storage (collectively, "local store" or "physical volume"). Typically the host receives an input or output ("I/O") request, formulates a corresponding read or write command, and transmits that command to the local store. Once the I/O has been completed, the local store reports the status of that command (e.g., showing that the specified data has been read or that the write has been completed) back to the host and the host then propagates that status back to the application. This allows the host to be able to determine generally what data has been committed to the local store, i.e., physically written to the disk, and what data potentially has not been committed, i.e., the host has not yet received a confirmation for that data or the data has not been written to disk yet.

Often it is not enough to allow the host to determine generally what data has been committed to the local store. In the event of a hardware failure or geographic catastrophe, having a backup of what was written to the local store can be crucial. Advantageously, a remote backup, i.e., one that is geographically distant from the local store, helps ensure that if a destructive event such as an earthquake or flood occurs at the location of the local store, the data committed to disk up to the time of the destructive event is retrievable from the remote store.

A traditional approach to backing up and storing data is to use a synchronous data replication scheme. In such a scheme, the local store and remote store are complete replicas of each other and any write operations performed to the local store are applied to the remote store. Once the write is completed at the remote site, the local store may processes the next write operation. Due to the requirements imposed by synchronization, e.g., that both stores are complete replicas of each other, a local store cannot report back to the host that it has completed its write operation until the remote store also reports back that it is done with the same operation. Waiting for write confirmations can affect performance severely. Synchronous data storage, though useful, is also hindered by latencies associated with speed-of-light issues when great distances separate the source and destination. The time required to synchronize data between stores across great distances tends to cause unacceptable performance degradation on the host side of the coupled synchronous stores.

Although synchronous storage generally supplies a consistent picture of what I/Os were committed to disk, it is latency heavy and does not make efficient use of the disk spindle hardware. For example, in some synchronous storage systems, the local disk spindles must wait for the remote store to report back that it completed the last set of I/O operations before writing new, incoming I/Os to disk. This involves a loss in performance since the time spent waiting for the I/O completion acknowledgement would be better spent committing other I/Os to the local disk.

The deficiencies are compounded when using a distributed architecture. Backing up a distributed architecture is also difficult with respect to time synchronization between volumes on the host side. One solution is to time-stamp every I/O that comes through the host before it is committed to disk. If every incoming I/O is time-stamped, however, there must typically be a single time-stamping mechanism. This creates a bottleneck since every incoming I/O, regardless of which volume it is applied to, must be ordered into a single-file line for time-stamping before being sent to the appropriate I/O handler. To alleviate the single-file line dilemma, ideally multiple time-stamping mechanisms could be used, allowing different I/Os to be time-stamped in parallel. Doing so, however, requires coordination between time-stamping mechanisms down to a fraction of a microsecond. If such synchronization is not achieved, different I/Os that span volumes may be ordered incorrectly, which would result in data corruption. Such coordination is not feasible since not only must time-stamp mechanisms be calibrated carefully, they must constantly be monitored to ensure they stay in synchronization.

Rather than wait for each I/O operation to individually complete, a second way to achieve synchronization is to periodically prevent incoming I/Os from committing, waiting until all write operations currently being performed are completed, copying the entire source store to the destination store, and upon completion of the copy, allowing incoming I/Os to begin committing again. This method is inefficient from a disk usage scenario because no new I/Os can commit during the copying process. Since no new I/Os can be committed, and existing I/Os are continually processed, the I/O queue depth drops lower and lower until it reaches 0, i.e., no new I/Os are processed and all existing I/Os have been committed to disk. In the storage domain, it is desirable to keep the efficiency of the storage mechanism's disk spindles as high as possible, i.e., to maximize the amount of disk read/writes per movement of the spindle arm. Stopping new I/Os from committing and allowing all current I/Os to be committed, effectively dropping the I/O queue depth to zero, is not efficient from a spindle utilization standpoint. A more robust and efficient approach is asynchronous replication.

One known technique of asynchronous replication helps to solve the remote-side bottleneck of synchronous replication. Rather than sending I/Os to the remote side and waiting for their completion status, this asynchronous replication technique begins by accepting incoming I/Os and committing them to both the disk and a journal. After the I/Os have been recorded in the journal, they are typically sent to the remote store (via, for example, an Ethernet connection). Beneficially, if the communications link between the local store and the remote store is down or is busy, journals may accumulate on the local side temporarily, effectively holding onto the data that represents the changes to the local store. Once the communications link is restored, journals may be sent to the remote store and their entries applied accordingly. Meanwhile, the local store has moved to the next set of incoming I/Os and has reported the completion status back to the host. Effectively, the local store reports completions back to the host at the rate required to write the I/Os to the disk.

Another asynchronous approach to improving efficiency is to use a "snapshot and bulk copy" mechanism on the local store, effectively capturing what the local store looked like at a given point in time. In the snapshot scenario, the local store is frozen so that the spindles have generally stopped handling incoming I/Os, but only for as long as it takes to create the snapshot image of the entire data store (as opposed to waiting until all existing I/Os have processed). Once the snapshot of the data store is complete, the queued I/Os are allowed through and the storage mechanism may continue processing I/Os. Then, while the system is processing new I/Os, the snapshot is transmitted to the remote data store. This data transfer, asynchronous to the processing of I/Os, can have better performance than synchronous schemes, but it is still inefficient because I/Os cannot commit during the snapshot process, which, depending on the size of the storage medium, could be seconds or even minutes. Making reliable backups using just this method is difficult because typically either the frequency of the snapshots is high (more frequent snapshots means a smaller rollback period in the event of a failure) or the time between snapshots is high (to maintain high performance).

SUMMARY OF THE INVENTION

A need exists for an asynchronous, ordered data replication scheme in which a local store is not required to wait for write conformation from the remote store and I/O queue depth is not completely depleted, nor does it need to wait for a snapshot of the entire data store to be taken. Additionally, a need exists for a distributed asynchronous ordered data replication scheme in which several physical volumes may be utilized to write data locally, while still overcoming the deficiencies of the prior art.

Though committal speed is improved by using known asynchronous replication techniques, a better solution scales beyond using one volume as a local store. When I/Os are committed to a single disk (as well as to a journal), determining the order writes are committed is generally simple: entries that appear later in the single-volume journal were generally committed later in time. For example, if the balance of a bank account was written to address 0x00001234 at $t_0$ and written again to the same address at $t_1$, the latter is the more current balance and would likely appear later in the journal. When data representing a cohesive local store is spread across multiple volumes, it is difficult to determine which I/O data came first. If one of the volumes' clock is set even slightly incorrectly, $t_1$ on volume 1 could occur before $t_0$ on volume 2.

The present invention achieves distributed asynchronous ordered replication using a journaled approach. Like the "snapshot and bulk copy" approach, the techniques described herein use a snapshot of the local store. Unlike the "snapshot and bulk copy" approach, however, as changes are made to the local store, the changes themselves are recorded in a separate section of memory or disk space called a "journal." Rather than frequent multi-gigabyte snapshots, instead multi-byte or multi-kilobyte differences ("deltas") are recorded as entries in the journal. The journals containing the deltas are then periodically sent to a remote store over a connection such as an Ethernet connection. After arriving at the remote store, a volume reconstruction engine applies the deltas within the journals to a previous snapshot of the local store. The remote store then represents what the local store looked like originally, plus any changes made up to the point of the last delta. Because the remote store is being sent deltas periodically, independent of the pace at which write are committed to the local store, the journaled method allows the local store to run at nearly full speed and not be bottlenecked by waiting for write confirmations from the remote store or for a full snapshot to occur.

Journaling is typically achieved by splitting write I/Os as they reach the software that writes to the physical store. The term "splitting" is used herein to mean "duplicating" and generally not "dividing." Effectively, in addition to the original I/Os being committed to disk, the duplicate of the I/Os are additionally written to the journal. By splitting the I/O, that is, making an additional and concurrent synchronous write to the journal, the present invention incurs only the time cost of a local mirrored write. This allows the application to proceed to the next set of pending I/Os, effectively running at full disk writing capability.

The invention described herein provides distributed asynchronous ordered replication. In accordance with one aspect, there is a method for distributed asynchronous ordered replication. The method includes creating a first journal for a first set of I/O data, creating a second journal for a second set of I/O data, and temporarily preventing committal, to a local storage device, of the second set of I/O data until the second journal is created. The first journal comprises entries, the entries comprising a first counter value. The second journal also comprises entries, the entries comprising a second counter value.

In another aspect, there is a system for distributed asynchronous ordered replication. The system includes a Fast Path, a Control Path, a first journal for a first set of I/O data, and a second journal for a second set of I/O data. The first journal comprises journal entries, the entries comprising a first counter value and representing an I/O operation of the first set of I/O data performed by the Fast Path. The second journal comprises journal entries, the entries comprising a second counter value and representing I/O operation of the second set of I/O data performed by the Fast Path. In implementations of the system, the second counter value may be different than the first counter value and the Control Path temporarily prevents the Fast Path from performing the second set of I/O data until the second journal is created.

Additionally, some implementations of the system include one or more of the following features. The system may include a first storage. The journal entries of the first and second journals may represent I/O operations performed by the Fast Path on the first storage. In addition to the first storage, the system may include a second storage for backing up the first storage. In some implementations, the journal entries of the first and second journals are applied to the second storage ordered by counter value. Entries with equal counter values are applied in a preferred order such as a random order, the order in which the journal entries are read, or according to the age of the first and second journals.

In some implementations of the system, the journal entries of the first journal are written at substantially the same time the Fast Path performs the I/O operations represented by the first set of I/O data. Additionally, the journal entries of the second journal are also written at substantially the same time the Fast Path performs the I/O operations represented by the second set of I/O data.

In another aspect, there is a computer program product, tangibly embodied in an information carrier, for achieving distributed asynchronous ordered replication. The computer program product includes instructions being operable to cause a data processing apparatus to perform several functions. The instructions are operable to create a first journal for a first set of I/O data, the first journal comprising entries, the entries comprising a first counter value. The instructions are also operable to cause the apparatus to create a second journal for a second set of I/O data, the second journal comprising entries, the entries comprising a second counter value. The instructions are also operable to cause the apparatus to temporarily prevent committal, to a local storage device, of the second set of I/O data until the second journal is created.

In another aspect, there is a means of distributed asynchronous ordered replication. Implementations of the means include means for creating a first journal for a first set of I/O data, the first journal comprising entries, the entries comprising a first counter value. The means also includes means for creating a second journal for a second set of I/O data, the second journal comprising entries, the entries comprising a second counter value. The means also includes means for temporarily preventing committal, to a local storage device, of the second set of I/O data until the second journal is created. In some embodiments, the second journal for the second set of I/O data is created before the first set of I/O data is finished committal.

Any of the above aspects can have one or more of the following features. The second journal for the second set of I/O data may be created before the first set of I/O data is finished committal. Before creating the first journal, the first set of I/O data may be written to the local storage device. It is also advantageous, in some implementations, to send the first journal to a remote storage device, and after sending the first journal to the remote storage device, applying the first journal to the remote storage device. In those implementations, after sending the first journal to the remote storage device, the second journal is also sent to the remote storage device. After the second journal is sent to the remote storage device, the entries of the first and second journals are applied to the remote storage device, ordered by the counter value. Entries with equal counter values are applied in a preferred order such as a random order or the order the journal entries are read during the application process.

Other aspects and advantages of the present invention will become apparent from the following description, taken in conjunction with the accompanying drawings, illustrating the principles of the invention by way of example only.

BRIEF DESCRIPTION OF THE DRAWINGS

FIGS. 3A, 3B, and 3C depict a system for achieving distributed asynchronous ordered replication.

DETAILED DESCRIPTION

A distributed asynchronous ordered replication approach is utilized together with the Fast Path architecture described below and in the published patent application 2003/0140209 ("'209 application"), which is incorporated herein by reference. In the architecture, data is written to the local store as quickly as practicable. As the Fast Paths write I/Os to disk, the changes made by the I/O operation are stored in a journal associated with the Fast Path that made the change. After the I/Os are committed to disk and journaled, completion status for committing the I/Os to the local disk is reported by the disk, back to the Fast Path, and then back to the host. After the completion status is reported back to the host, the next batch of I/Os is processed by the Fast Path. Furthermore, the journals are periodically packaged to be sent to the remote store for application, the packaging procedure occurring asynchronously with the I/O committal/completion reporting procedure.

Commits to the local store can occur in generally any order, allowing for committal organizing algorithms to be used to optimize the efficiency of the movement of disk spindle across the disk heads. In some embodiments, the order that writes are committed to the local store may even be different than the order the corresponding entries are written in the journal because of the write ordering performed by committal organizing algorithms. Additionally, at any one point in time, several concurrent I/Os may be awaiting committal while, for example, later but smaller I/Os are committed and recorded in the journals.

To order journal entries on the host side and the remote side, the system described herein does not typically rely on a mechanism as absolute as a time-stamp; rather, the system utilizes the general order in which I/Os were committed to disk. Because concurrent I/Os may be committed in any order, the ordering of the journal entries, however, is generally relative to other I/Os. To achieve this ordering, the system utilizes tag values in journal entries to differentiate between coarse-grained points in time. A review of one example of the implementing architecture is beneficial.

Figure 1A:
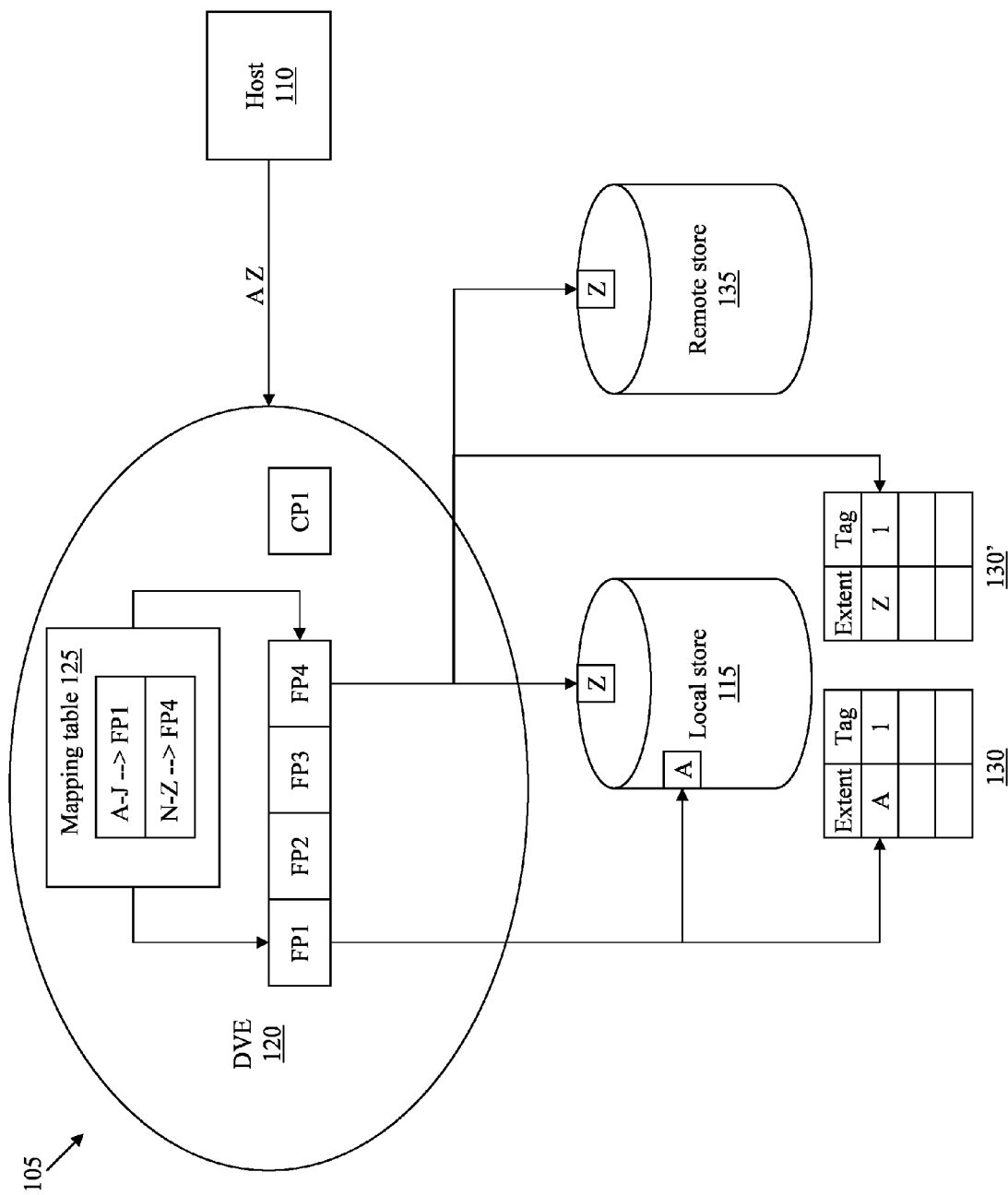
FIG. 1A depicts an architecture in for distributed asynchronous ordered replication.

FIG. 1A depicts a Fast Path architecture 105. Broadly, the architecture 105 includes a host 110 that sends I/O operations to a local store 115 for committal. More specifically, the host 110 sends the I/O operations, typically "write" operations, to a Distributed Virtualization Engine (DVE, 120). The DVE 120 is a software layer and/or hardware layer that acts as an abstract interface to the local store 115 (or a plurality of local stores 115 (not shown here)) such that the host 110 is unaware of how the I/Os are ultimately handled. The DVE 120 serves to virtualize the storage such that a host 110 accesses generally one virtual storage device, which may in fact map to multiple physical volumes. The host 110 typically receives only confirmation from the DVE 120 that the I/Os were committed to the local store 115.

The DVE 120 includes Fast Paths (FP1 . . . FP4, collectively, "Fast Paths") and Control Paths ("CPs," e.g., CP1) as described in the above-mentioned published and incorporated by reference '209 application. As described in the '209 application, in one embodiment, a path designated using a Fast Path, when connecting the host 110 to the local store 115, may be used when performing I/O operations such as read and write operations. For example, in FIG. 1A, the host 110 sends I/Os to be committed to the local store 115 at data locations (herein "extents") A and Z to the DVE 120. The DVE 120, in turn, queues the I/Os for committal by the appropriate Fast Paths (FP1 and FP4, respectively) according to a mapping table 125, which is established by the Control Path CP1. FIG. 1A illustrates FP1 handling the I/Os for extents 0-M and FP4 handling I/Os for extents N-Z. The Fast Paths then commit the I/Os to the local store 115 and, in some embodiments, also write those entries into journals 130, 130' or to a remote store 135. The tag value depicted for each journal entry (i.e., "1") is described below. After the Fast Paths have committed the I/Os to the physical volume 115, the committal status of each I/O is communicated back to the respective Fast Path, and then the DVE 120 returns the committal status to the host 110.

The Fast Paths and Control Paths serve different roles within the DVE 120. The Fast Path is typically limited to implementing very simple I/O operations ("I/O primitives") such as reading from and/or writing to disk, striping and/or mirroring. The Control Paths implement higher-level, more complex operations such as error recovery and configuration changes (e.g., establishing or changing mapping tables). Mapping tables 125 allocate ranges of extents to Fast Paths and describe where data for a given virtual destination should be written, i.e., the address or offset on the physical local store 115. The Control Path CP1 assigns mapping table 125 entries to different Fast Paths to efficiently accomplish the higher-level operations.

Figure 1B:
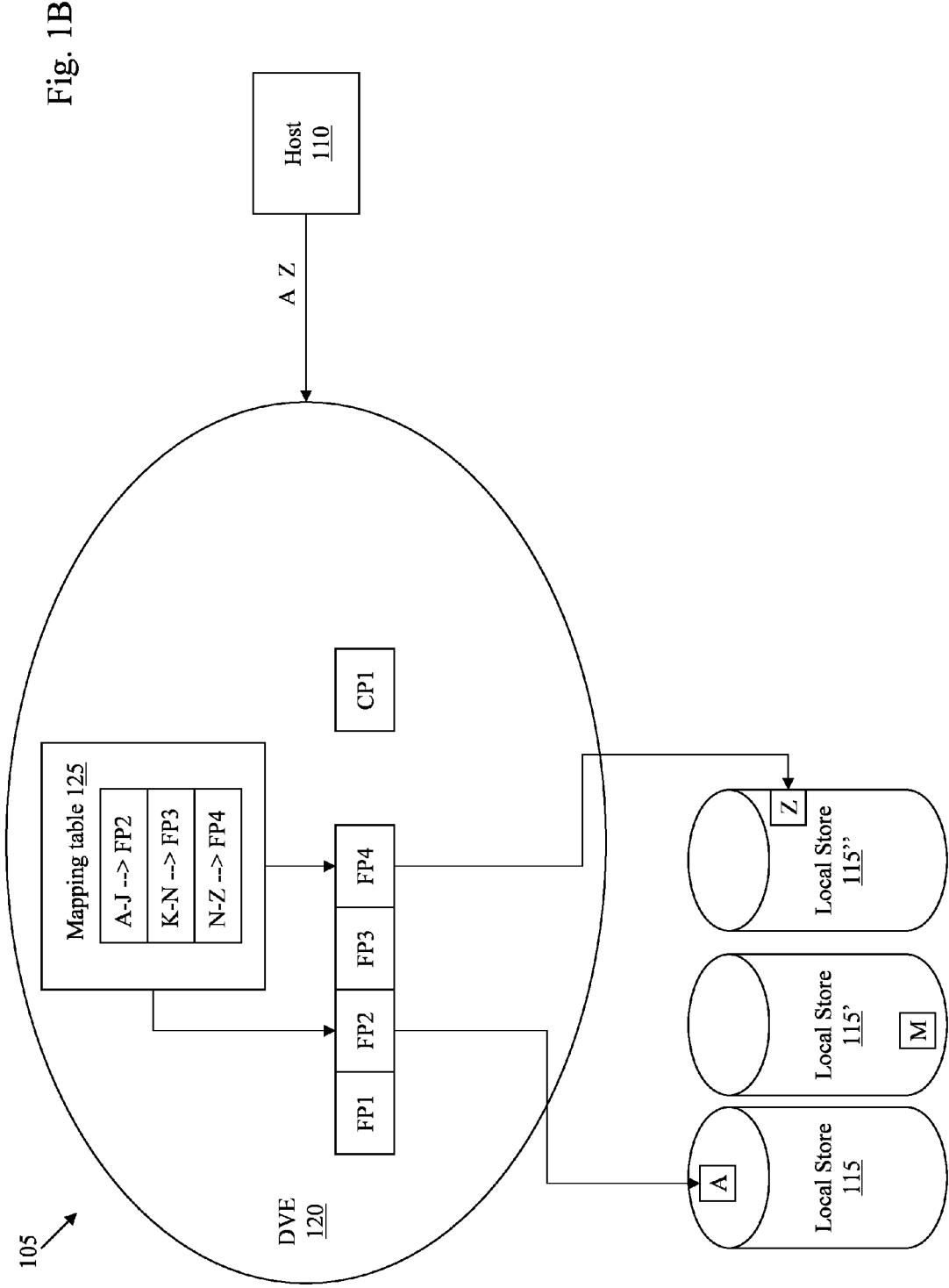
FIG. 1B depicts the architecture of FIG. 1A comprising a consistency group.
Figure 1C:
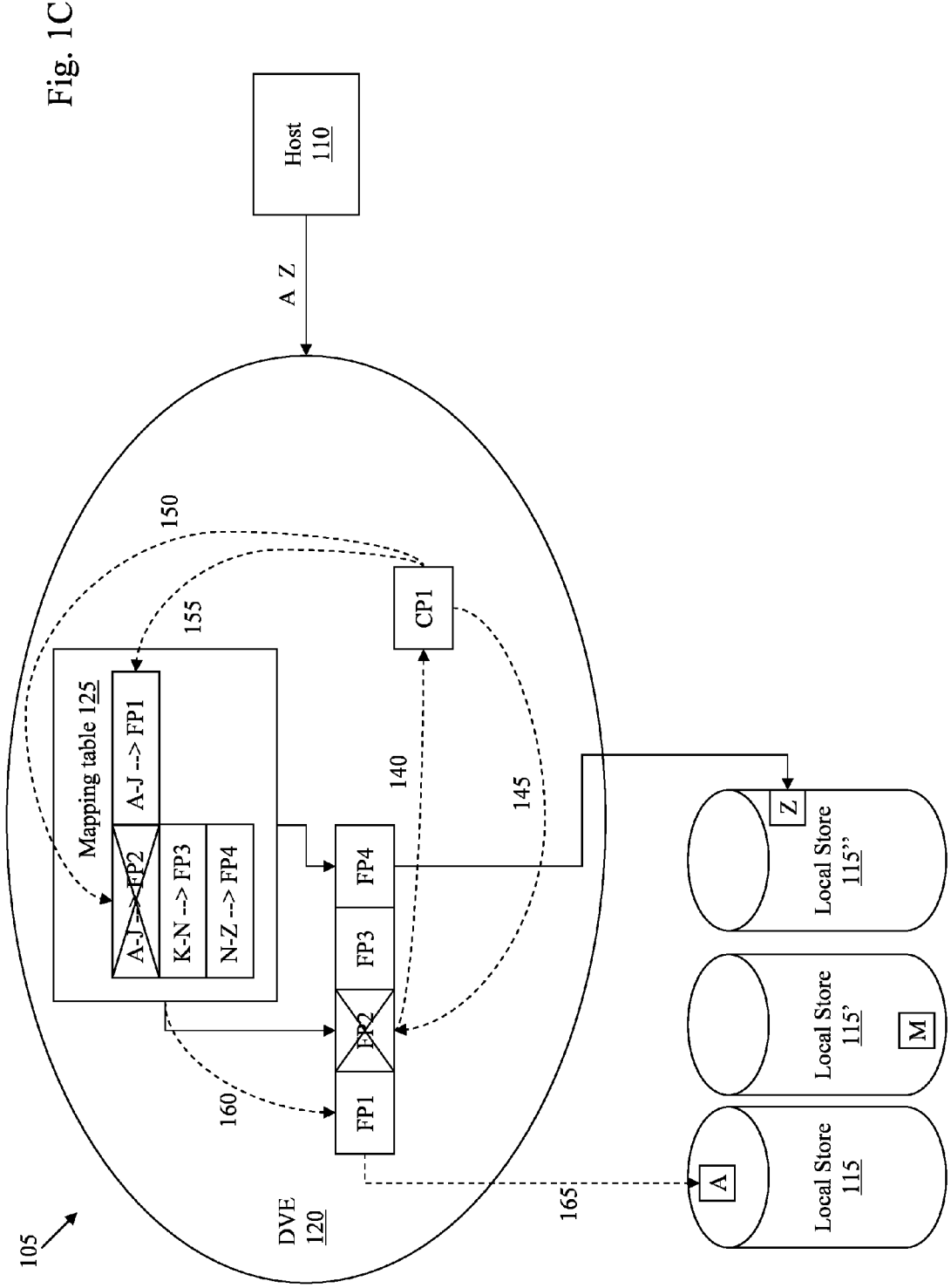
FIG. 1C depicts management of a consistency group in the event of a failure.

FIGS. 1B and 1C depict the relationship between Fast Paths and Control Paths. Referring to FIG. 1B, consider disk striping, i.e., RAID 0, as an example. In disk striping, one logical volume is spread across two or more physical volumes (FIG. 1B depicts three physical volumes 115, 115', 115"). To achieve disk striping of a logical volume 0 through Z (where "Z" is an offset of the address of 0), the Control Path CP1 maps extents 0 through J to FP2, extents K through M are mapped to FP3, and extents N through Z are mapped to FP4. When an I/O comes into the DVE 120 for extent A, it is sent via the mapping table to FP2. When an I/O comes in for extent Z, that I/O is correspondingly sent to FP4. Each Fast Path writes to and reads from its respective physical volume, unaware of any higher-level logical relationship in which the Fast Path is participating. But because the Control Path CP1 created a mapping of Fast Paths for writing the data for one logical volume, i.e. extents 0-Z, across three physical disks, striping is achieved.

To achieve optimal performance, generally the Fast Paths are pre-authorized to handle I/O operations for a given set of extents. That is, once the mapping tables 125 are set up, if a write or read operation comes into the DVE 120 for a mapped extent, the I/O is handled directly by the appropriate Fast Path with little or no intervention by the Control Path or other Fast Paths. In some embodiments, however, only successful I/O operations are handled by the Fast Paths. In these embodiments, error cases, such as writing faults, and their associated recoveries, may be performed in connection with one or more Control Paths, since this type of error recovery may involve changes to the mapping tables 125.

Still referring to FIG. 1B, the striping example described above is an example of a consistency group. A consistency group is a group of physical volumes (e.g., 115, 115', 115") that make up a logical volume. Consistency groups allow the DVE 120 to optimize disk performance. If the entire logical volume is confined to a single physical volume 115, then writes to the logical volume are limited by the write speed of the single physical volume's disk spindle, that is, I/Os bound for 0-Z are limited by how fast the arm of the physical store 115 can move across the disk. Distributed across three physical volumes 115, 115', 115", I/O committal is spread across three disk spindles and typically occurs in a more timely fashion because I/Os are not waiting for the single spindle arm to complete its current write. Instead, the load is spread across the disks and the individual spindles are less burdened.

Distributing a logical volume across multiple physical disks 115, 115', 115" requires additional management. The separate physical volumes that make up the logical volume should be replicated and/or backed up together since they are effectively useless without each other. If only the volume representing N-Z is backed up, or all three are backed up individually using separate mechanisms, an attempt to restore the entire range of 0-Z is impractical since it is difficult to verify cohesion between the data stored on one physical disk 115 versus the others 115', 115". For example, for an I/O at $t_0$ that spans extents H-L, part of the data (H-J) is written to physical store 115 while the other portion (K-L) is written to the physical store 115'. If the members of the consistency group are not replicated as a cohesive whole, then it is difficult, if not impossible, to verify that data on the physical store 115 at $t_0$ actually aligns with data on the physical store 115' at $t_0$ (i.e., $t_0$ on one disk is actually $t_0$ on another disk). Thus consistency groups are managed as a cohesive whole.

FIG. 1C depicts management of a consistency group in the event of a failure. Managing the consistency group is the responsibility of the Control Path CP1. The Control Path CP1 determines which Fast Paths will participate in committing the I/Os to the logical volume (that is, which Fast Paths have write authorization for the physical disks that make up the consistency group) and ultimately, how distributed asynchronous ordered replication is handled. With respect to managing the consistency group, in some embodiments, the Control Path CP1 adds and subtracts Fast Paths to the list of Fast Paths participating in the consistency group as necessary. Briefly referring back to FIG. 1B, I/Os that come in to the DVE 120 for A and Z are mapped to FP2 and FP4, respectively. In FIG. 1C, if the switch that FP2 resides in fails, the I/O, unable to be committed, is sent (step 140) to the Control Path CP1. The Control Path CP1 confirms (step 145) that FP2 has failed and removes and/or updates (steps 150, 155) the old entry for 0-J, remapping the range that FP2 was responsible for to FP1. The I/O is then sent through the mapping table, dispatched to FP1 (step 160), and committed (step 165) to disk. Note that FP1 had not previously committed data to any of the physical volumes that are part of the consistency group. Though not depicted, typically any writes performed by the Fast Paths are additionally journaled (e.g., to the journals 130, 130' of FIG. 1A) by the Fast Path.

In the event that the Control Path remaps extents to a different Fast Path, the techniques described herein beneficially handle the ordering of journals for the Fast Paths that wrote to that extent before and after the remapping. Using the example illustrated in FIG. 1C, if all Fast Paths committing data to the consistency group are recording the I/Os in journals (e.g., the journals 130, 130' of FIG. 1A) that represent the changes made to the physical volumes, then FP2 and FP1 both have journals representing changes made to the physical volume 115. To replicate the logical volume of the consistency group on a remote store 135, the journals from both Fast Paths are applied to the remotes store's snapshot. The problem is further compounded when efficient disk writing algorithms are implemented and I/Os are written to disk 115-115" in a different order than they are recorded in the journals 130, 130'. In those scenarios I/Os may be committed in an order different than that which they arrived in. Time-stamps, as described previously, may not absolutely order journal entries between volumes.

The methods and apparatus described herein achieve asynchronous ordered replication by utilizing a tag value to represent coarse grained intervals of replication. The tag value is a variable that the Control Path CP1 sets in each Fast Path when the Control Path CP1 either updates the mapping tables (e.g., 125 of FIG. 1A) or the Control Path CP1 wants to begin a new replication interval. The tag value is useful for reconstructing the general, though not absolute, order of I/O committals. One example of a reconstruction is when the journals 130 are received by the remote store 135 and are applied to the remote data store 135 to create a back up of the local stores 115-115".

As I/Os are sent through the Fast Path and correspondingly written to journals, a copy of the current tag value is then written to every journal entry. The tag value indicates the journal entry's "age" with respect to that extent. If a Control Path CP1 reassigns the extent to another Fast Path or declares a new replication interval for the consistency group, the Control Path CP1 increments the tag values across all of the Fast Paths that are assigned to physical volumes 115 participating in the consistency group. Any journal entry written with the new tag value, whether by the same Fast Path or a different one (if the extent was mapped to a new Fast Path), is now "younger" with respect to that extent.

A journal generally has a finite amount of space in which to record I/Os. Each journal entry a Fast Path writes to the journal 130 takes up a portion of that finite space. When a journal 130 has little or no space left to write entries to, the journal has "filled up", and the Fast Path that is allocated that journal 130 alerts the Control Path CP1. The Control Path CP1 then allocates the Fast Path a new journal 130. In some embodiments, the tag value is incremented after a journal 130 fills up and before a new journal 130 is allocated. In other embodiments, however, if the extents the Fast Path is responsible for have not been mapped to a new Fast Path, or a new replication interval has not been declared by the Control Path CP1, the Fast Path's tag value remains the same and entries that are written to the new journal 130 have the same tag value as entries in the full journal 130. In those scenarios, the entries in both journals 130 are effectively the same age in terms of the coarse-grained replication interval. In a preferred embodiment, this replication interval is every 30 seconds, though this parameter can be configurable so that the implementer of the system can determine how large a rollback can be tolerated in the event of a system failure.

Figure 2:
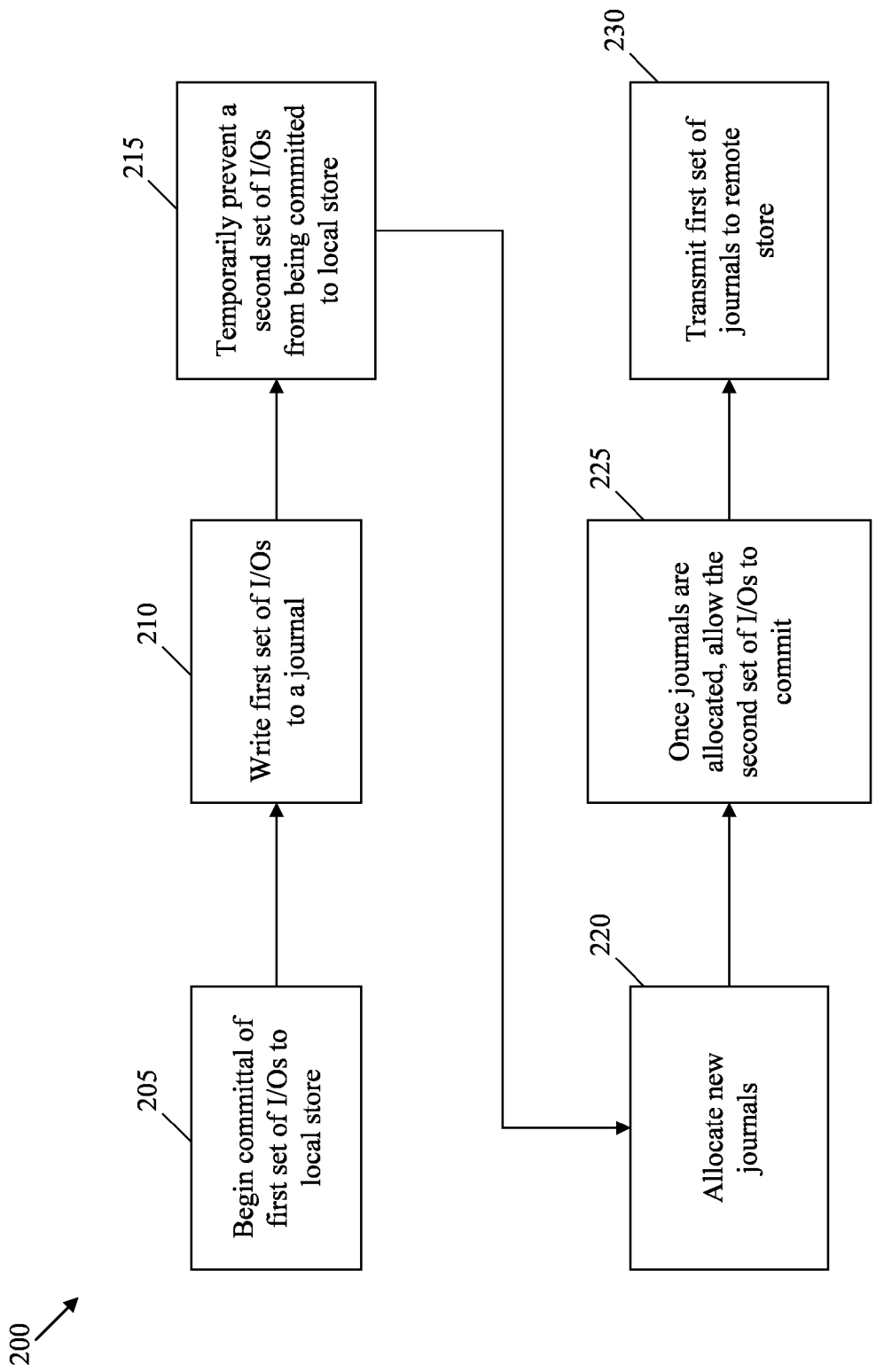
FIG. 2 depicts a method for achieving asynchronous replication.

FIG. 2 depicts a method 200 for achieving asynchronous replication in accordance with an embodiment of the present invention. The method 200 includes beginning the committal (step 205) of a first set of I/Os to one or more local stores 115 in a consistency group. As Fast Paths write (step 205) I/Os to the local store(s), a corresponding entry for each committal is written (step 210) to a journal 130. Though steps 205 and 210 are illustrated serially, journal entries can be written (step 210) concurrently with I/O committals (step 205) to the local store. As described, writing a journal entry for each I/O committal typically incurs only the time cost of a local mirroring operation. As the first set of I/Os are in the process of committal (step 205) and journaling (step 210), the Control Path temporarily prevents (step 215) a second set of I/Os from being committed to the local store 115. Preventing new I/Os from being committed is typically accomplished by revoking the write authorizations of the Fast Paths. This effectively creates an I/O barrier and blocks the Fast Paths from accepting or committing new I/Os. I/Os from the first set of I/Os, i.e., the I/Os that were already in the process of being committed/journaled, however, were "in-flight" while the Fast Paths were still authorized to handle them. Thus the Fast Paths continue processing the in-flight I/Os while the new, second set of I/Os are blocked. During this temporary pause, the Control Path allocates (step 220) new journals 130 for each of the Fast Paths in the consistency group and increments the tag value of each Fast Path. Once each Fast Path has been allocated (step 220) a new journal 130, the Control Path typically re-grants write authorizations (or grants new write authorizations) to the Fast Paths and the second set of I/Os are "released," (step 225) i.e., are no longer prevented from being committed. The second set of I/Os are then committed (step 225) to the volumes of the local store 115 by the Fast Paths (per the mapping file 125) and the corresponding entries are written by each Fast Path into its respective new journal 130 (the journal entries reflecting the incremented tag value). In a preferred embodiment, the journals are allocated to the Fast Paths and the new I/Os are allowed to begin committal before the first set of I/Os have completed processing, i.e., the second set of I/Os begin committal before the first set of I/Os finish committal/being journaled. Beneficially, in that embodiment, the I/O queue does not empty and the number of pending I/Os that the Fast Paths are processing does not reach zero, thus allowing the local store spindles to remain generally active throughout the process.

In some embodiments, the I/Os from the first set of I/Os may not be finished being committed (step 205) or journaled (step 210) after the second set of I/Os are released. In those embodiments, I/Os from the first set of I/Os are committed to disk, and the journal entries representing the first set of I/Os are written to the old journals with the old tag values. New I/O committals are journaled in the new journals with the new tag values. After all of the I/Os that represent the first set of I/Os have been journaled (step 210), the journals 130 which represent the first set of I/Os are transmitted (step 230) to a remote store 135 by the Control Path. At the remote store, the journals 130 are reassembled (described below) into a general replica of the local logical volume.

Figure 3B:
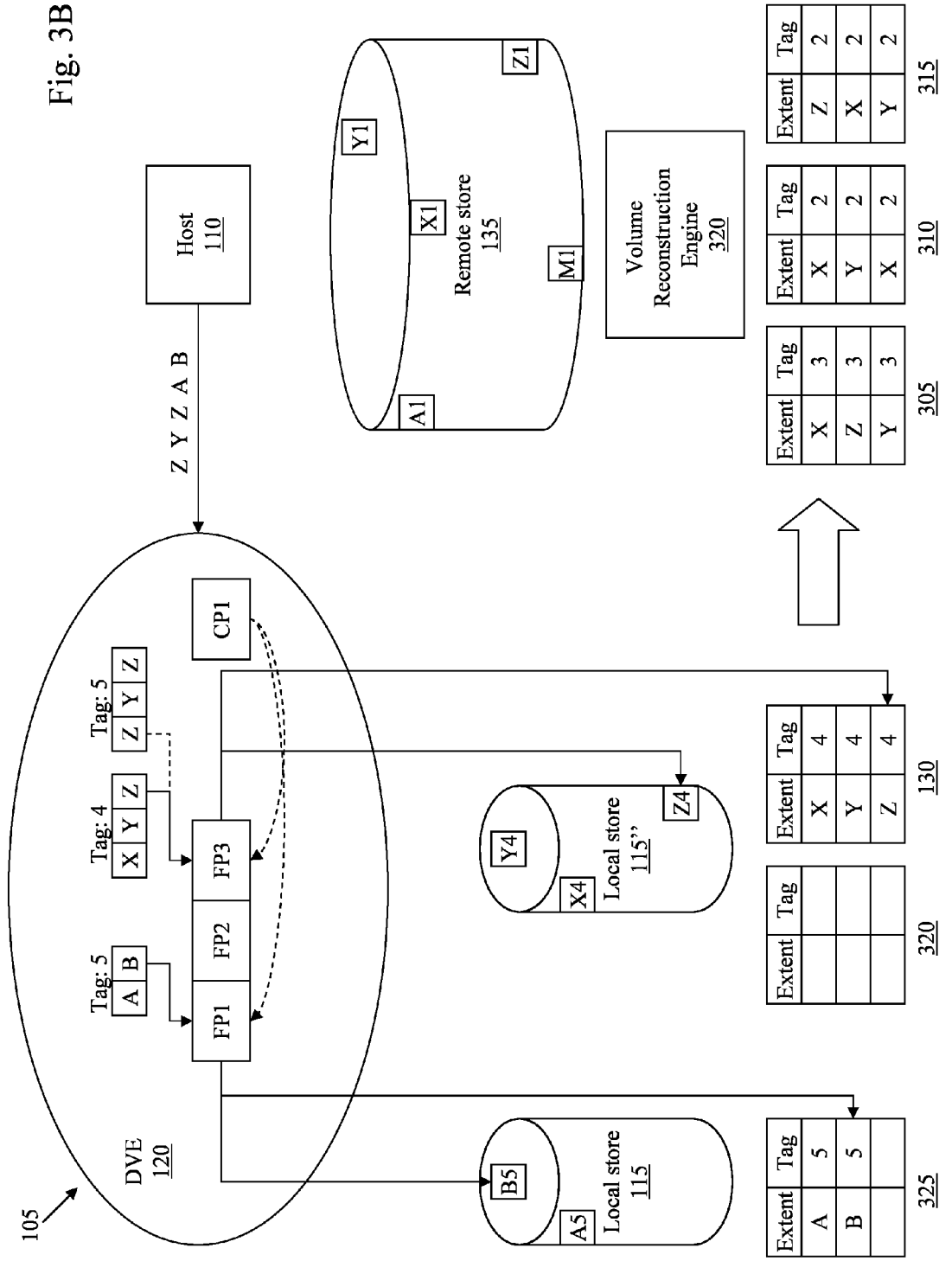
Figure 3C:
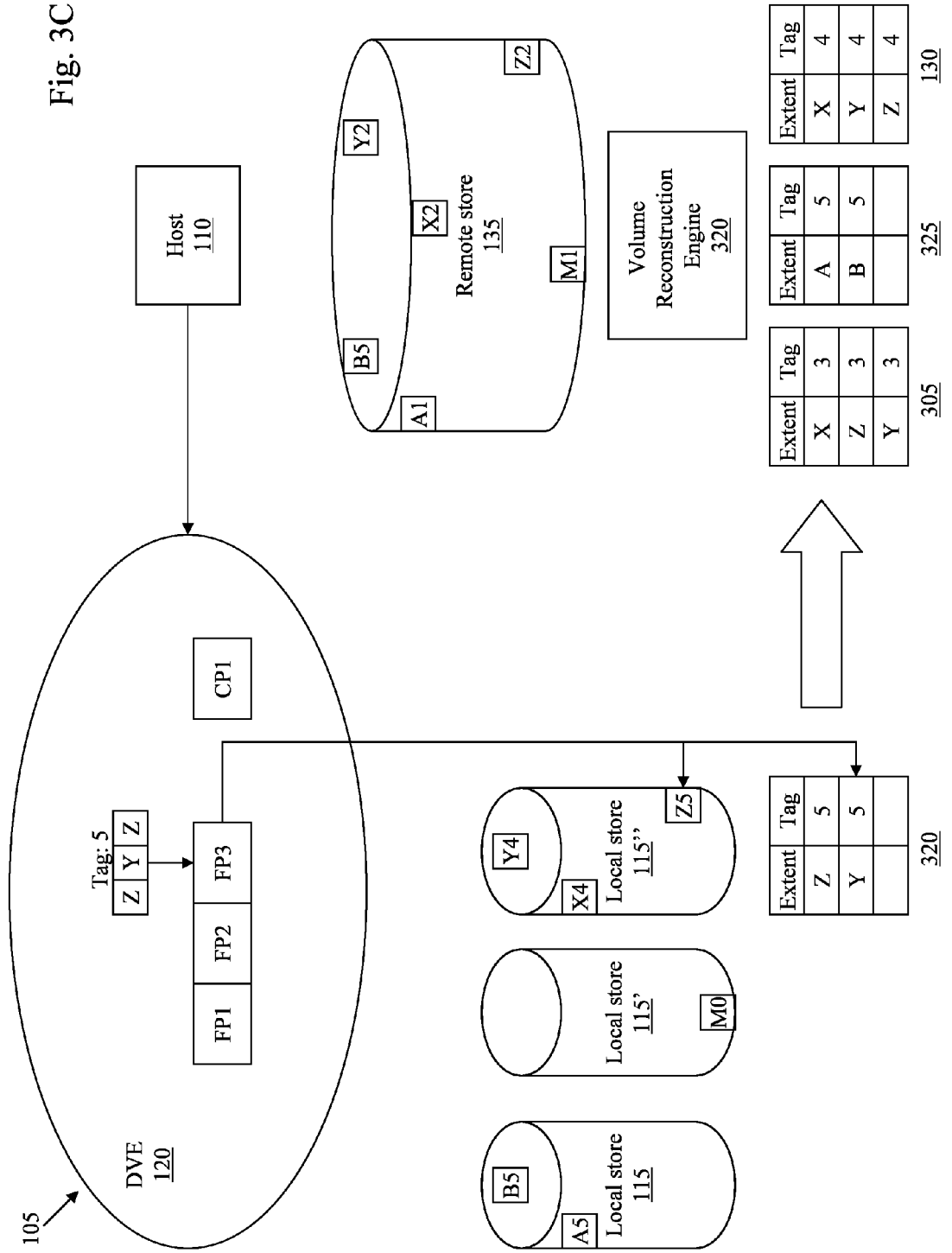

FIGS. 3A-3C depict achieving distributed asynchronous ordered replication using tag value ordering. Referring to FIG. 3A, the host 110 sends I/O operations X, Y, and Z to the DVE 120, which in turn dispatches them to the Fast Paths. In this example, FP3 is pre-authorized to write extents Q-Z (and thus X, Y, and Z) on local store 115". Local stores 115, 115', 115" are part of the same consistency group, with FP1 being authorized for extents 0-J on physical volume 115, FP2 for K-P on physical volume 115', and FP3 for Q-Z on physical volume 115". A single queue of I/Os for the DVE 120 is depicted, but in one or more embodiments, the DVE 120 may have a single I/O queue or multiple I/O queues, potentially one or more for each Fast Path. The separate queues are depicted as such only for illustration purposes. Additionally, references such as X4, Y4, and Z3 illustrate the extent (the character) and the particular tag value (the digit) that the Fast Path committed and journaled. These are merely illustrative and do not indicate the form of any data actually written to either store 115, 135.

In FIG. 3A, as FP3 commits I/Os to the local store 115", FP3 also writes the corresponding entries into its allocated journal 130. In this example, during this replication interval, i.e., "4", FP3 previously committed data to extent X (as indicated by the X entry in the journal 130) and is currently processing the queue entry to Y, i.e., committing data for extent Y as well as writing a corresponding entry in the journal 130. Previous journals 305, 310, 315, were transmitted to the remote store 135 for committal by the volume reconstruction engine 320. Note that journal 310, 315 have entries with tag values of 2, yet both contain entries for two of the same extents, i.e., X and Y. For entries with the same tag value, the order of committal to the remote store 135 is generally not important. In some embodiments, the volume reconstruction engine 320 applies the journal entries in a random order. In other embodiments they are applied in the order they are read or processed. In versions where the Control Path CP1 uses a time-stamping mechanism to keep track of journals for a given Fast Path, the volume reconstruction engine 320 applies the earlier of the two or more journals first.

Some examples of tag-value ordering follow. In some embodiments, the volume reconstruction engine 320 applies the entries of journal 310 first, followed by the entries of journal 315, then the entries of journal 305. In other embodiments, the volume reconstruction engine 320 applies the entries of journal 315 first, followed by entries of journal 310, and then entries of journal 305. In still other embodiments, journals 310, 315 have an associated age value (not shown), such that journals 310, 315 from the same Fast Path for the same extent are distinguishable as to their chronological order. This is not the same as the tag value that indicates the "age" of a journal entry with respect to a particular extent. The tag value is entry-oriented, where as the age value is journal-oriented for journals from the same Fast Path for the same extents. In these embodiments, a time-stamping mechanism is are used because the coordination between multiple Fast Paths is not necessary. In some embodiments, the control path sets the age of the journal 310, 315 via a timing mechanism during the allocation of the journal. In other embodiments, the age is set via the Fast Path's timing mechanism as the Fast Path begins writing to the journal 310, 315. In either embodiment, if the timing mechanisms of the Control Path or the Fast Path are generally reliable, the respective timing mechanisms can be utilized to determine which of two journals 310, 315 for a given extent is the earlier one. What is important is that the volume reconstruction engine 320 applies the entries of journals 310, 315 with lower tag values before the journals 305 whose entries have higher tag values. As a result, the remote store replicates only what the local store 115" could have contained, not necessarily what the local store 115" did contain.

FIG. 3B illustrates a tag value switch. FIG. 3B depicts what typically occurs after the events of FIG. 3A. In FIG. 3B, the host 110 sends I/Os for extents Z, Y, Z, A, and B to the DVE 120 (the mapping table 125 is omitted only to aid in illustration). The Control Path CP1 pauses (step 215 of FIG. 2) the FP1's and FP3's acceptance of new incoming I/Os from the queue. The Control Path CP1 allocates (step 220) a new journal 325, 330 for each Fast Path accessing one or more volumes in the consistency group (although only FP1 and FP3 are depicted as being allocated new journals, 330, 325, respectively). Upon the Control Path CP1 allocating each Fast Path of the consistency group a new journal 325, 330, the Control Path provides each Fast Path with a new tag value, i.e., "5".

The pausing of new I/Os lasts only as long as it takes for all Fast Paths to be allocated new journals 325, 330, with the new tag value ("5") and in a preferred embodiment, before the Fast Paths have finished committing and journaling the first set of I/Os for tag value "4". Thus, since FP1 does not have any pending I/Os, it may begin processing its new A and B I/Os immediately after all Fast Paths have been allocated journals 325, 330. FP3, however, has a pending I/O (Z from before the pause) so FP3 has to commit that I/O to the local store 115" first before FP3 can commit any of the new Z, Y, or Z I/Os. After committing the old Z I/O to the local store 115" and journal 130, FP3 can process the new Z, Y, and Z I/Os using tag value 5, writing those entries in its newly allocated journal 325. While FP3 was waiting to commit Z to the local store 115", A was committed to local store 115 by FP1 (reflected in journal 330), which is now in the process of committing I/O B.

At the remote store 135, journals 305, 310, 315 with varying tag values have been received and are awaiting committal. As described above, journals 310 and 315 have a tag value of 2 and thus the volume reconstruction engine 320 applies I/Os for their extents before journal entries with higher tag values for those extents, i.e., journal 305 with a tag value of 3. X1 is updated to have data from one of the X2 I/Os in journals 310 or 315. Y1 likewise is updated to have Y2 data from journals 310 or 315. Z1 is updated, however, only to have Z2 data from journal 315. Having X2 and Z2 from journals 315 and Y2 from journal 310 on the data store at the same time, even if the local store 115 never actually contained that particular data set, is acceptable. As long as all data from tag value 2 is applied before any of the tag value 3 entries from journal 305 are applied, and hence the result represents what the local store 115 could have looked like, this is enough to achieve acceptable distributed asynchronous ordered replication.

In FIG. 3C, journals for tag value 2 from FIGS. 3A and 3B have been applied to the remote store 135 (and are thus no longer depicted). In FIG. 3C, the X, Y, and Z extents have data from the journals 310, 315 as discussed in connection with a tag value 2. A journal for tag value 3 and the journals for FP1 and FP3, that were written to in FIG. 3B, are awaiting committal, as are the journals 130 with entries for X, Y, and Z for tag value 4 and 330 with entries for A and B for tag value 5. Journal 325, currently being used, is sent to the remote store 135, typically when the journal 325 fills up or another replication interval occurs.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes routers, hubs, and/or a switching fabric. The components of the system can be interconnected by any form or medium of digital data communication, e.g., a communication network. Examples of communication networks include a local area network ("LAN") and a wide area network ("WAN"), e.g., the Internet, and include both wired and wireless networks.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

From the foregoing, it will be appreciated that the systems and methods provided by the invention afford an effective way to achieve distributed asynchronous ordered replication of a database.

What is claimed is:

1. A method of maintaining committal of I/O data to achieve distributed asynchronous ordered replication, the method comprising:
    creating a first journal for a first set of I/O data to be committed to a local storage device, the first journal comprising entries, the entries comprising a first counter value that is the same for all entries of the first journal and the order of entries in the first journal being independent of the order of the first set of I/O data committed to the local storage;
    creating a second journal for a second set of I/O data to be committed to the local storage device, the second journal comprising entries, the entries comprising a second counter value that is the same for all entries of the second journal and the order of entries in the second journal being independent of the order of the second set of I/O data committed to the local storage;
    temporarily preventing committal, to the local storage device, of the second set of I/O data until the second journal is created; and
    beginning committal of the second set of I/O data to the local storage device before the first set of I/O data is finished committal.

2. The method of claim 1 further comprising committing the first set to I/O data to the local storage device and to the first journal at substantially the same time.

3. The method of claim 1 wherein the local storage device comprises a plurality of storage devices.

4. The method of claim 3 wherein the first journal is a plurality of journals.

5. The method of claim 3 wherein the second journal is a plurality of journals.

6. The method of claim 1 wherein the second journal is created in response to the first journal filling up.

7. The method of claim 1 wherein the second journal is created in response to a replication interval occurring.

8. The method of claim 7 wherein the replication interval occurs every 30 seconds.

9. The method of claim 1 further comprising sending the first journal to a remote storage device.

10. The method of claim 9 further comprising after sending the first journal to the remote storage device, applying the first journal to the remote storage device.

11. The method of claim 9 further comprising after sending the first journal to the remote storage device, sending the second journal to the remote storage device.

12. The method of claim 11 further comprising applying the entries of the first and second journals to the remote storage device, ordered by the entries' counter value.

13. The method of claim 12 wherein entries with equal counter values are applied in a preferred order.

14. The method of claim 13 wherein the preferred order is a random order.

15. The method of claim 13 wherein the preferred order is that which the journal entries are read in.

16. The method of claim 13 wherein the preferred order is according to the age of first and second journals.

17. A system for distributed asynchronous ordered replication, the system comprising:
    a fast path for performing journal operations;
    a control path; and
    a first storage device comprising
        a first journal for a first set of I/O data, the first journal comprising journal entries, the entries comprising a first counter value that is the same for all entries of the first journal, the order of entries in the first journal being independent of the order of the first set of I/O data committed to the local storage, and representing an I/O operation of the first set of I/O data performed by the fast path; and
        a second journal for a second set of I/O data, the second journal comprising journal entries, the entries comprising a second counter value that is the same for all entries of the second journal, and the order of entries in the second journal being independent of the order of the second set of I/O data committed to the local storage, and representing I/O operation of the second set of I/O data performed by the fast path;
    wherein the second counter value is different than the first counter value and wherein the control path temporarily prevents the fast path from performing the second set of I/O data until the second journal is created, allowing for performance of the second set of I/O data before finishing performance of the first set of I/O data.

18. The system of claim 17 wherein journal entries of the first and second journals represent I/O operations performed by the fast path on the first storage.

19. The system of claim 18 further comprising a second storage for backing up the first storage.

20. The system of claim 19 wherein journal entries of the first and second journals are applied to the second storage ordered by counter value, wherein entries with equal counter values are applied in a preferred order.

21. The system of claim 20 wherein the preferred order is a random order.

22. The system of claim 20 wherein the preferred order is that which the journal entries are read in.

23. The system of claim 20 wherein the preferred order is according to the age of the first and second journals.

24. The system of claim 17 wherein the journal entries of the first journal are written at substantially the same time the fast path performs the I/O operations represented by the first set of I/O data and the journal entries of the second journal are written at substantially the same time the fast path performs the I/O operations represented by the second set of I/O data.

25. A computer program product, tangibly embodied in a machine-readable storage device, for maintaining committal of I/O data to achieve distributed asynchronous ordered replication, the computer program product including instructions being operable to cause a data processing apparatus to:

create a first journal for a first set of I/O data to be committed to a local storage device, the first journal comprising entries, the entries comprising a first counter value that is the same for all entries of the first journal and the order of entries in the first journal being independent of the order of the first set of I/O data committed to the local storage;

create a second journal for a second set of I/O data to be committed to the local storage device, the second journal comprising entries, the entries comprising a second counter value that is the same for all entries of the second journal and the order of entries in the second journal being independent of the order of the second set of I/O data committed to the local storage;

temporarily prevent committal, to the local storage device, of the second set of I/O data until the second journal is created; and begin committal of the second set of I/O data to the local storage device before the first set of I/O data is finished committal.

26. A system for maintaining committal of I/O data to achieve distributed asynchronous ordered replication without using a universal timestamp for ordering journal entries, the system comprising:

a local storage device;

means for creating a first journal for a first set of I/O data to be committed to the local storage device, the first journal comprising entries, the entries comprising a first counter value that is the same for all entries of the first journal and the order of entries in the first journal being independent of the order of the first set of I/O data committed to the local storage;

means for creating a second journal for a second set of I/O data to be committed to the local storage device, the second journal comprising entries, the entries comprising a second counter value that is the same for all entries of the second journal and the order of entries in the second journal being independent of the order of the second set of I/O data committed to the local storage;

means for temporarily preventing committal, to the local storage device, of the second set of I/O data until the second journal is created; and means for beginning committal of the second set of I/O data to the local storage device before the first set of I/O data is finished committal.

* * * * *

UNITED STATES PATENT AND TRADEMARK OFFICE
CERTIFICATE OF CORRECTION

PATENT NO.      : 7,624,109 B2
APPLICATION NO. : 11/067453
DATED           : November 24, 2009
INVENTOR(S)     : Richard Testardi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this

Fourteenth Day of December, 2010

David J. Kappos
*Director of the United States Patent and Trademark Office*